United States Patent
Bradley et al.

(10) Patent No.: US 10,919,581 B2
(45) Date of Patent: Feb. 16, 2021

(54) WAKE DISRUPTOR FOR USE WITH A LAND VEHICLE

(71) Applicant: COMPAGNIE GENERALE DES ETABLISSEMENTS MICHELIN, Clermont-Ferrand (FR)

(72) Inventors: Calvin Rhett Bradley, Greenville, SC (US); Lucas Thompson, Seekonk, MA (US); Christopher Bellino, Charlestown, MA (US); Ray Ayala, Mansfield, MA (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 171 days.

(21) Appl. No.: 16/060,810

(22) PCT Filed: Dec. 12, 2016

(86) PCT No.: PCT/US2016/066201
§ 371 (c)(1),
(2) Date: Jun. 8, 2018

(87) PCT Pub. No.: WO2017/100781
PCT Pub. Date: Jun. 15, 2017

(65) Prior Publication Data
US 2020/0164932 A1  May 28, 2020

(30) Foreign Application Priority Data
Dec. 11, 2015 (WO) ................ PCT/US2015/065244

(51) Int. Cl.
B62D 35/00 (2006.01)

(52) U.S. Cl.
CPC ......... *B62D 35/001* (2013.01); *B62D 35/007* (2013.01)

(58) Field of Classification Search
CPC .... B62D 35/00; B62D 35/002; B62D 35/001; B62D 35/007
(Continued)

(56) References Cited

U.S. PATENT DOCUMENTS

| 2,514,695 | A | * | 7/1950 | Dempsey | ............ | B62D 35/001 |
| | | | | | | 296/208 |
| 3,156,175 | A | | 11/1964 | Werner | | |

(Continued)

FOREIGN PATENT DOCUMENTS

| CN | 103693118 A | 4/2014 |
| DE | 102012021862 A1 | 5/2013 |

(Continued)

OTHER PUBLICATIONS

International Search Report and Written Opinion for Application No. PCT/US2016/066201 dated Mar. 10, 2017.

(Continued)

*Primary Examiner* — Dennis H Pedder
(74) *Attorney, Agent, or Firm* — Hahn Loeser & Parks LLP; Bret A. Hrivnak

(57) ABSTRACT

Particular embodiments of the invention comprise a wake disruptor (112) for use on the rear side (102) of a land vehicle (100), a method of using the wake disruptor to reduce drag of a land vehicle, and a land vehicle including the wake disruptor. The wake disruptor forms a protrusion extending outwardly from a rear side of the land vehicle by a distance of 1.5 to 8 inches and has a length extending at least partially in a direction of the vehicle width. The land vehicle may comprise a motorized or powered vehicle and/or a towed object, such as a trailer.

20 Claims, 10 Drawing Sheets

(58) Field of Classification Search
USPC .............. 296/180.1, 180.2, 180.4; 180/901
See application file for complete search history.

(56) References Cited

U.S. PATENT DOCUMENTS

| | | | |
|---|---|---|---|
| 3,960,402 A | 6/1976 | Keck | |
| 3,973,478 A | 8/1976 | Gotz | |
| 3,999,797 A * | 12/1976 | Kirsch | B62D 35/001 296/180.4 |
| 4,142,755 A | 3/1979 | Keedy | |
| 4,214,787 A | 7/1980 | Chain | |
| 4,653,795 A * | 3/1987 | Soderberg | B62D 35/007 296/180.1 |
| 4,746,160 A * | 5/1988 | Wiesemeyer | B62D 35/001 105/1.1 |
| 5,172,954 A * | 12/1992 | Yamazaki | B62D 35/007 296/180.1 |
| 5,311,412 A * | 5/1994 | Yang | B60Q 1/302 296/180.1 |
| 5,863,090 A * | 1/1999 | Engler | B62D 35/00 296/180.1 |
| 6,139,090 A | 10/2000 | Stidd | |
| 6,378,932 B1 * | 4/2002 | Fasel | B62D 35/001 296/180.5 |
| 7,641,262 B2 | 1/2010 | Nusbaum | |
| 7,699,382 B2 | 4/2010 | Roush et al. | |
| 7,850,224 B2 | 12/2010 | Breidenbach | |
| 8,100,461 B2 | 1/2012 | Smith et al. | |
| 8,251,436 B2 | 8/2012 | Henderson et al. | |
| 8,342,595 B2 | 1/2013 | Henderon et al. | |
| 8,360,509 B2 | 1/2013 | Smith et al. | |
| 8,360,510 B2 | 1/2013 | Smith et al. | |
| 8,491,036 B2 | 7/2013 | Henderson et al. | |
| 8,684,447 B2 | 4/2014 | Henderson et al. | |
| 8,708,399 B2 | 4/2014 | Smith et al. | |
| 8,783,757 B2 | 7/2014 | Henderson et al. | |
| 8,876,191 B2 | 11/2014 | Breidenbach | |
| 9,039,069 B2 | 5/2015 | Smith et al. | |
| 9,139,241 B1 | 9/2015 | Smith | |
| 9,145,177 B2 | 9/2015 | Smith et al. | |
| 9,168,959 B2 | 10/2015 | Smith et al. | |
| 9,834,262 B2 * | 12/2017 | Baker | B62D 35/001 |
| 2002/0030384 A1 * | 3/2002 | Basford | B62D 35/001 296/180.1 |
| 2005/0012358 A1 | 1/2005 | Choi et al. | |
| 2008/0315623 A1 * | 12/2008 | Khalighi | B62D 33/0273 296/180.5 |
| 2011/0272964 A1 | 11/2011 | Henderson et al. | |
| 2013/0076064 A1 * | 3/2013 | Smith | B62D 35/001 296/180.1 |
| 2013/0106136 A1 | 5/2013 | Smith et al. | |
| 2015/0367900 A1 * | 12/2015 | Buffo | B62D 35/001 296/180.4 |

FOREIGN PATENT DOCUMENTS

| | | |
|---|---|---|
| EP | 2927103 A1 | 10/2015 |
| JP | 2013052762 A | 3/2013 |
| WO | 2008144025 A2 | 11/2008 |
| WO | 2011140181 A2 | 11/2011 |
| WO | 2011153185 A2 | 12/2011 |
| WO | 2012051134 A2 | 4/2012 |
| WO | 2012051174 A1 | 4/2012 |
| WO | 2013043890 A1 | 3/2013 |
| WO | 2013063479 A1 | 5/2013 |
| WO | 2014011886 A1 | 1/2014 |
| WO | 2014210360 A1 | 12/2014 |
| WO | 2015007942 A1 | 1/2015 |

OTHER PUBLICATIONS

International Search Report and Written Opinion for Application No. PCT/US2015/065244 dated Aug. 8, 2016.
https://www.atdynamics.com/broll.htm ATDynamics Trailer Tail images downloaded from web site on Oct. 29, 2019.
https://www.atdynamics.com/trailertail.htm ATDynamics Trailer Tail images from website as of Sep. 26, 2011.
www.SmartTruckAero.com Smart Truck Installation Manual dated Jan. 14, 2014.
www.SmartTruckAero.com Smart Truck Parts Catalog dated Oct. 2015.
https://www.smarttruckaero.com/products-overview/top-kit SmartTruck TopKit Aero System images from website as of Oct. 13, 2016.
J.D. Coon, et al.; Drag Reduction of a Tractor-Trailer Using Planar Boat Tail Plates, Department of Mechanical and Aeronautical Engineering, Clarkson University, pp. 249-265, no date listed.

* cited by examiner

WAKE DISRUPTOR FOR USE WITH A LAND VEHICLE

CROSS-REFERENCE TO RELATED APPLICATIONS

This application claims priority to International Patent Application No. PCT/US2015/065244 filed on Dec. 11, 2015, with the U.S. Patent Office (as the Receiving Office), which is hereby incorporated by reference.

BACKGROUND

Field

This disclosure relates generally to wake disruptors arranged to project from a rear side of a land vehicle.

Description of the Related Art

Fuel economy is certainly important to land vehicle fleets, such as fleets of over-the-road trucks, as the cost of fuel is a key business expense. It is appreciated that aerodynamic drag comprises more than half of the drag on tractor trailers at interstate speeds. One of the main sources of aerodynamic drag occurs at the rear end of the trailer. As the trailer moves under tow of a land vehicle, pressure is reduced at the rear end of the trailer, which retards forward motion of the vehicle. This reduction in pressure results from a turbulent wake that forms behind the trailer (or more generally, the land vehicle) in which there are large and turbulent recirculating areas of airflow, which are known as vortices or eddies, as air moves to fill the low pressure behind the trailer. Prior art devices simply relocate the vortices, often pushing them towards a bottom side of the vehicle, and do not reduce the vortices and, as a result, the drag. Accordingly, there is a need for an improved device to disrupt and/or separate the recirculating airflow moving behind the rear end of a land vehicle, such as a tractor trailer.

SUMMARY

Particular embodiments comprise a wake disruptor for use on the rear side of a land vehicle, a method of using the wake disruptor to reduce drag of a land vehicle, and a land vehicle including the wake disruptor. The wake disruptor forms a protrusion extending outwardly from a rear side of the land vehicle by a distance of 1.5 to 8 inches and has a length extending at least partially in a direction of the vehicle width. The land vehicle may comprise a motorized or powered vehicle and/or a towed object, such as a trailer.

Certain embodiments of such methods of using a wake disruptor to reduce drag of a land vehicle include providing a land vehicle having a front side spaced apart from a rear side to define a length of the land vehicle, a left side spaced apart from a right side to define a width of the land vehicle, and a top side spaced apart from a bottom side to define a height of the land vehicle. Such methods further include arranging a wake disruptor along the rear side of the land vehicle in a configuration to reduce drag of the land vehicle, the wake disruptor forming a protrusion extending outwardly from the rear side by a distance of 1.5 to 8 inches and having a length extending at least partially in a direction of the land vehicle width between a pair of opposing terminal ends, the pair of opposing terminal ends each forming a free end.

Certain embodiments of such land vehicles include a front side spaced apart from a rear side to define a length of the land vehicle, a left side spaced apart from a right side to define a width of the land vehicle, and a top side spaced apart from a bottom side to define a height of the land vehicle. The land vehicle further includes a wake disruptor arranged along the rear side of the land vehicle in a configuration to reduce drag of the land vehicle, the wake disruptor forming a protrusion extending outwardly from the rear side by a distance of 1.5 to 8 inches and having a length extending at least partially in a direction of the land vehicle width between a pair of opposing terminal ends, the pair of opposing terminal ends each forming a free end.

The foregoing and other embodiments, objects, features, and advantages will be apparent from the following more detailed descriptions of particular embodiments, as illustrated in the accompanying drawings wherein like reference numbers represent like parts of each embodiment.

DETAILED DESCRIPTION

Figure 1:
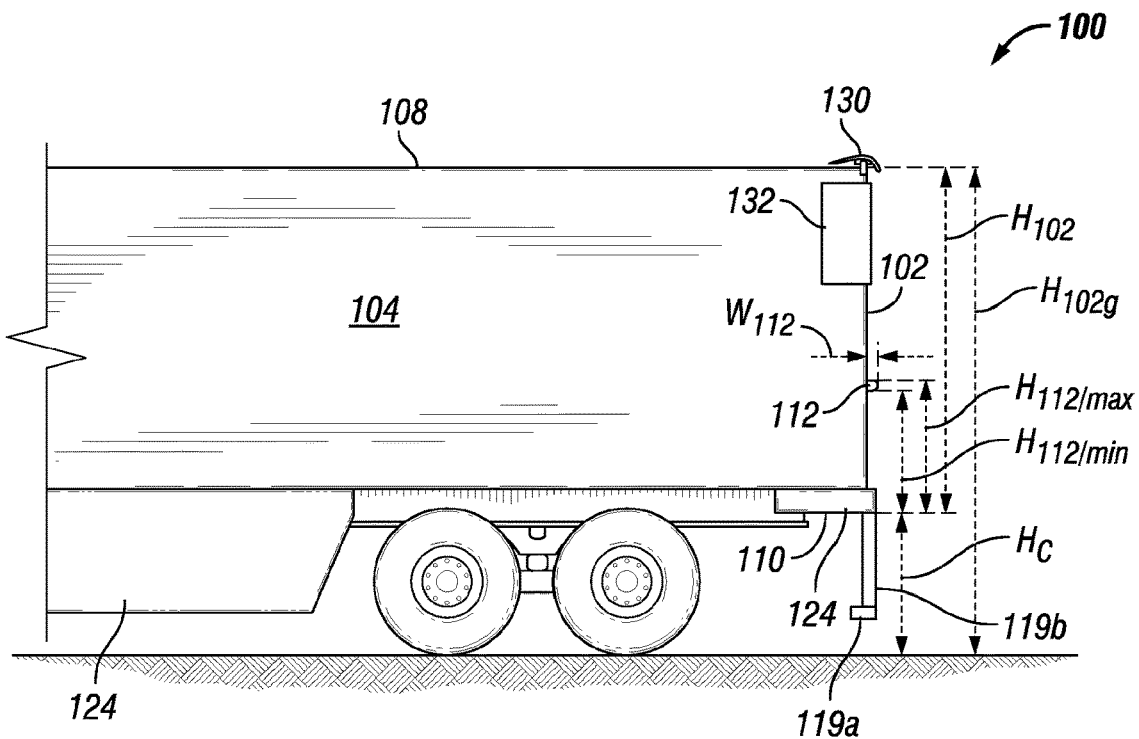
FIG. 1 is a side view of a land vehicle with a wake disruptor arranged along a rear end of the land vehicle, in accordance with an embodiment.

Certain embodiments comprise a wake disruptor for use with a land vehicle, a land vehicle with the wake disruptor, and a method of using the wake disruptor to disrupt and/or separate the airflow along the rear side of the land vehicle. In particular instances, the airflow descends from a top side of a rear end (also referred to as a rear side) of the land vehicle towards a bottom side of the rear end of the land vehicle, which is referred to herein as downward airflow, which may also be or result in turbulent airflow. Particular embodiments are further described herein, in association with the figures included herewith.

In particular embodiments, a method of using a wake disruptor to reduce and/or separate a downward airflow is described, where downward airflow is airflow directed downward the rear side of the vehicle. In performing such methods, certain embodiments include providing a land vehicle. The land vehicle has a front side and a rear side, the rear side being spaced apart from the front side to define a length of the land vehicle. The land vehicle also has a left side and a right side, the right side surface being spaced apart from the left side to define a width of the land vehicle. The land vehicle further includes a top side and a bottom side, the top side being spaced apart from the bottom side to define a height of the land vehicle. As used herein, the term "land vehicle" refers to a vehicle capable of travelling on land, which includes any motorized unit, such as, for example, a car, truck, tractor unit, or recreational vehicle, and/or any towed object, such as a trailer, camper, platform, or lift, although any other towed object known to one of ordinary skill may be employed. In embodiments in which the land vehicle includes a towed object, the rear side of the land vehicle is understood to mean the rear-most side of the towed object. By example, if the land vehicle is a truck towing a trailer, such as a tractor trailer, the rear side of the land vehicle is the rear side of the trailer. Optionally, the rear side may include one or more doors, which may be hinged or retractable doors, for example, as well as door hardware, such as hinges, latching mechanisms, locking mechanisms, vertical bars, and other features understood by one skilled in the art.

The method further comprises arranging a wake disruptor along the rear side of the land vehicle in a configuration to reduce and/or separate the downward or turbulent airflow. The rear side of the land vehicle is the rear-most side of the land vehicle, including any towed objects attached to the land vehicle. The rear side may include one or more doors, a frame around the doors, and a skirt or bumper extending downward toward the bottom side, such as from a door or door frame if present. When referring to the height of the rear side herein, the height is measured from the top of the rear side, where the top side of the land vehicle intersects the rear side, and from the bottom of the rear side, where the bottom side of the land vehicle intersects the rear side. Stated differently, the top and bottom of the rear side are defined to be the top most and the bottom most location where air does not pass through the rear side. For example, on a trailer where a bumper extends downwardly from a location on the rear side and an open space is arranged between the bumper and the location of the trailer from which it extends, the bumper and the structure attaching the bumper to the trailer are not considered part of the rear side height. A door, as referenced herein, only refers to the door itself and not the door frame or any other structure surrounding the door. The door may be any door that opens and closes to permit access to an interior of the land vehicle or towed object. For example, the door may be a hinged door that swings in any desired direction, such as towards a left or right side of the vehicle, or a retractable door that slides along a track, such as up and down. It is appreciated that the wake disruptor may be attached to the rear side of the land vehicle, including any door or other structure forming a portion of the rear side. Attachment may be achieved using any known manner to achieve permanent or removable fixation. For example, attachment may be achieved using an adhesive, fasteners, and/or welding. It is also appreciated that the wake disruptor may be formed as a portion of a door.

A wake disruptor forms a protrusion extending outwardly from the rear side of the land vehicle. The wake disruptor has a length extending at least partially in a direction of a land vehicle width between a pair of opposing terminal ends, the pair of opposing terminal ends each forming a free end (i.e., an end that does not contact any one or more upper fairings and does not contact any one or more side fairings, should any of the upper and/or side fairings be employed). The wake disruptor also has a width extending from a vehicle-engaging side of the wake disruptor to an outward-facing side of the wake disruptor, which is cantilevered when the wake disruptor is arranged along the land vehicle and a thickness extending from a top side of the wake disruptor to a bottom side of the wake disruptor. The wake disruptor can be described as being elongate, as its length is significantly greater than its width and thickness. In particular embodiments, the length is at least a 2.75 multiple of the wake disruptor width (that is, at least equal to 2.75 multiplied by the wake disruptor width), at least a 5.5 multiple of the wake disruptor width, at least a 7.5 multiple of the wake disruptor width, up to a 11 multiple of the wake disruptor width, up to a 15 multiple of the width, up to a 20 multiple of the width, a 2.75 to 20 multiple of the width, a 5.5 to 15 multiple of the width, or a 7.5 to 11 multiple of the width. In particular embodiments, the length is equal to at least 50%, 50% to 75%, at least 75%, or the substantial full width of the rear side land vehicle width, where a gap is not present along the length of the wake disruptor or where a gap of 18 inches or less is present along the length of the wake disruptor. When a gap is present, it can be said that two or more wake disruptors are present, where each can be arranged elevationally at the same height (to constitute a single wake disruptor having a discontinuous length) or at different height, where in any such instance, the two or more wake disruptors may be, for example, at least 25% to 50% the rear side land vehicle width or 25% to 50% the width of a door arranged along the rear side of the land vehicle. In any embodiment, the wake disruptor width is at least a multiple of 1.5, 4, or 8 of the wake disruptor thickness, up to at least a multiple of 12, 16, 32, or 64 of the wake disruptor thickness, or a multiple of 4 to 16, 1.5 to 64, 2 to 32, or 4 to 16 of the wake disruptor thickness. It is appreciated that each of the width and thickness may be constant or variable along the length of the wake disruptor. In certain embodiments, the wake disruptor has a width of 1.5 to 8.0 inches or 2 to 4 inches, and a thickness of ⅛ to 1 inch. In certain embodiments, in each of the embodiments above, the length is 22 to 30 inches. Additionally, in certain embodiments, the width tapers in a narrowing manner along any one or more portions of the wake distributor length. In certain embodiments, this narrowing occurs along portions of the length approaching each of the terminal ends (furthest extends), where the terminal ends define the length of the wake disruptor. Further, in certain embodiments, the wake disruptor narrows in thickness to each terminal end of the pair of opposing terminal ends defining the length of the wake disruptor.

As for the length, the length may extend fully or partially across the width of the rear side of the land vehicle. In certain embodiments where the length extends partially across the rear side width, the length of the wake disruptor extends at least 50% or at least 75% across the width of the rear side of the land vehicle. As the rear side may include one or more doors, the length of the wake disruptor extends fully or partially across the combined width of the one or more doors. In extending partially across the width of the doors, in certain embodiments, the length of the wake disruptor extends at least 50% or at least 75% across the combined width of the one or more doors.

It is appreciated that the length of the wake disruptor may be continuous or discontinuous, and formed of one or more portions. In embodiments where the wake disruptor has a continuous length, the disruptor may be formed of a single portion or multiple portions arranged integrally to form a unitary structure. In embodiments where the wake disruptor has a discontinuous length, the disruptor is formed of multiple (two or more) portions, where two or more portions are spaced apart such that the length of the wake disruptor extends from one terminal end of one portion to one terminal end of another of the two or more portions, such that the length of wake disruptor includes the length of each portion and the distance of any spacing or gap between each of the two or more portions. A spacing or gap may be provided, for example, in certain instances, to permit passage of door hardware, such as locking or latching hardware, or any other member though a portion of the length of the wake disruptor. In lieu of a gap, a hole may extend through a thickness of the wake disruptor to permit this passage for door hardware or any other member. Also, in lieu of a gap, a flexible flap or member may be arranged between spaced apart portions of the wake disruptor to reduce or eliminate the gap. Other members may also be used to partially or fully fill or span the gap. By further example, a spacer (flexible or rigid) may be arranged within the gap to reduce or fill the gap. For example, a removable foam spacer may be arranged between spaced apart portions of the wake disruptor to partially, substantially, or fully fill any gap.

It is also appreciated that the length of the wake disruptor may be linear, curvilinear, or non-linear. In certain embodiments, the wake disruptor length is linear. In other embodiments, the length of the wake disruptor is curvilinear, such as to form an arc or a U or W-shaped length, which may remain upright or inverted when arranged along the vehicle. In other embodiments, the wake disruptor is more generally non-linear, such as to form any such curvilinear length or any V or W-shaped arrangement, or inversion thereof, each of which is formed of a plurality of line segments.

In particular embodiments, in arranging the wake disruptor along the rear side of the land vehicle, the wake disruptor is arranged at or below a midpoint (50%) of the rear side height, as measured from the bottom side of the land vehicle to the top side of the land vehicle, and which is referenced to herein as a maximum height of the wake disruptor, and at least at a height greater than or equal to ten percent (10%) of the rear side height, which is referenced to herein as a minimum height of the wake disruptor. In other variations, where the wake disruptor is arranged along a door, the wake disruptor is arranged at or below a midpoint (50%) of the door's height, and at least at a height greater than or equal to ten percent (10%) of the height of the door. In more specific instances, the wake disruptor is arranged at least 59 inches above the ground and up to 104 inches above ground, such as when, for example, the wake disruptor is arranged on a trailer rear side having an overall height as measured from the ground of 13 feet 6 inches (162 inches) having a pair of 111 inch high doors where the bottom of the doors are located 48.5 inches above the ground.

In certain embodiments, any wake disruptor contemplated herein is sufficiently rigid, and may be comprised of any desired material or combination of materials, such as steel or aluminum. In other embodiments, while remaining generally rigid, the wake disruptor is resilient, that is, sufficiently deformable or durable under compression, so to be capable of being crushed or deformed, such as when opening doors, without notably damaging the wake disruptor or the functionality of the wake disruptor, permitting return to its original position and configuration. This resilient wake disruptor may be formed of any desired material or combination of materials, which includes any elastomeric material (which may form natural or synthetic rubber, or any combination thereof) or reinforced elastomeric material.

When using the wake disruptor as contemplated herein, the downward or turbulent airflow along the rear side of the vehicle is reduced and is even separated in certain situations. In certain embodiments, the wake disruptor is used in cooperation with any combination of one or more optional aerodynamic features arranged on the land vehicle. For example, in certain instances, each of the left and right sides of the land vehicle may include an aerodynamic skirt extending downwardly from a bottom side of the land vehicle, which are commonly used for the purpose of controlling the flow of air across the bottom of the trailer to reduce drag. These skirts commonly comprise one or more panels arranged to extend along a length of the land vehicle to create at least a partial barrier to a void extending between the bottom of the land vehicle and a surface upon which the land vehicle operates. These side skirts are commonly used on trailers, but may be used on other land vehicles, including any towed object. In instances when a land vehicle optionally employs the use of one or more skirts along a left or right side of the land vehicle, the wake disruptor is arranged elevationally above the skirt, and in more particular embodiments, 28 to 32 inches elevationally above the skirt. In another example, in certain instances, the wake disruptor is used in conjunction with at least one upper fairing attached to the top side along the rear side of a land vehicle, and at least one side fairing arranged along each opposing left and right side of the land vehicle along the rear side of the land vehicle. These fairings can form airfoils that control the direction of air flow from any respective top, left, and right side of the land vehicle and to a location behind the rear side of the land vehicle. These fairings are commonly used on trailers, but may be used on other land vehicles, including any towed object. Exemplary top and side fairings include the SmartTruck Top Kit sold by SmartTruck Systems. In embodiments in which the wake disruptor is used in conjunction with at least one upper fairing and at least one side fairing, the wake disruptor does not contact any of the at least one upper fairing(s) and/or any of the at least one side fairing(s). In certain instances, when using the wake disruptor with side fairings, it is beneficial for the bottom-most point of the bottom side of the wake disruptor to be arranged at a height of 18.5 inches above the bottom of the rear side of the land vehicle or the bottom of a door employed thereon. For example, when the wake disruptor is V-shaped, the bottom-most point of the bottom side is the bottom apex of the "V". Additionally, it is beneficial for the top-most point(s) of the top side of the wake disruptor to be arranged at a height of 31 inches above the bottom of the rear side of the land vehicle or the bottom of a door employed thereon. In addition, or in separate instances, the top most point(s) is(are) arranged just beneath the bottom end of the one or more side fairings. For example, when the wake disruptor is V-shaped, the top-most point of the top side is any one or both of the opposing terminal ends each forming one of the top ends of the "V".

Particular embodiments of the wake disruptors, land vehicles, and methods discussed above will now be described in further detail below in association with the figures filed herewith exemplifying particular embodiments of the wake disruptors and land vehicles.

Figure 2:
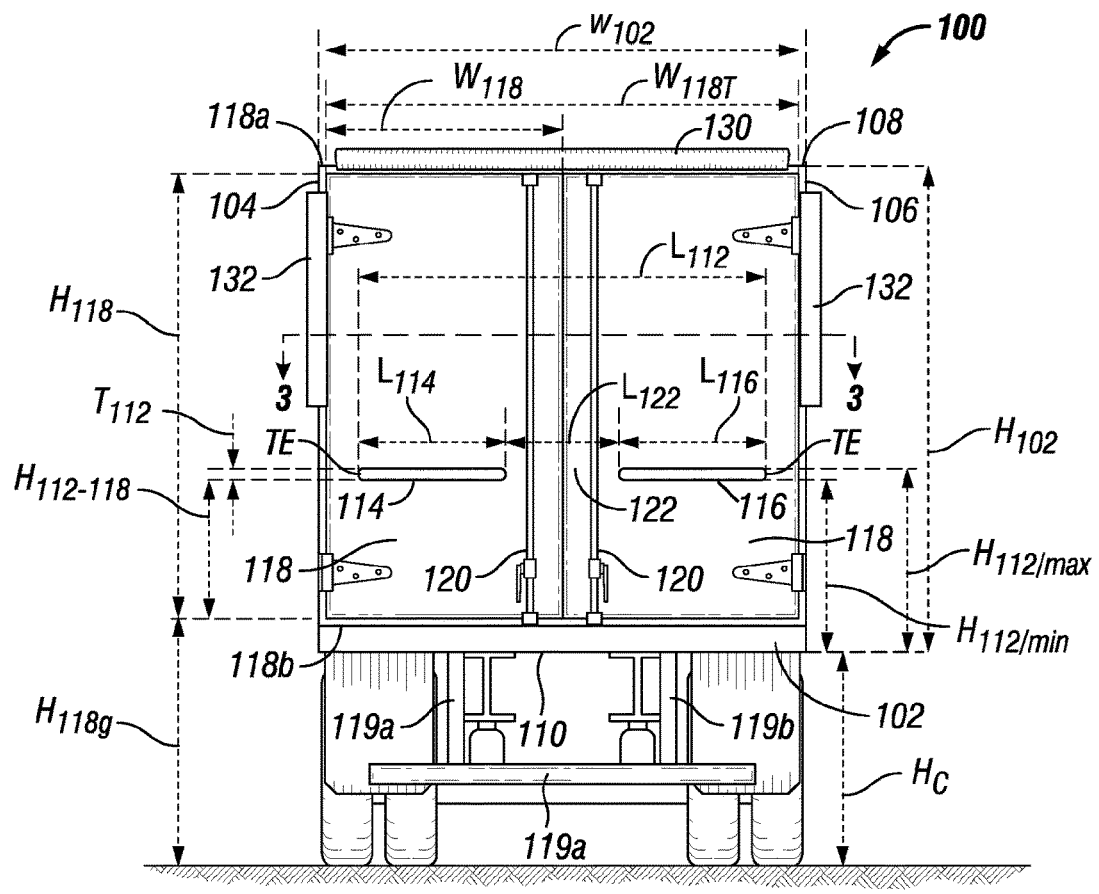
FIG. 2 is a rear view of the land vehicle of FIG. 1 with the wake disruptor arranged along the rear end of the land vehicle.
Figure 3:
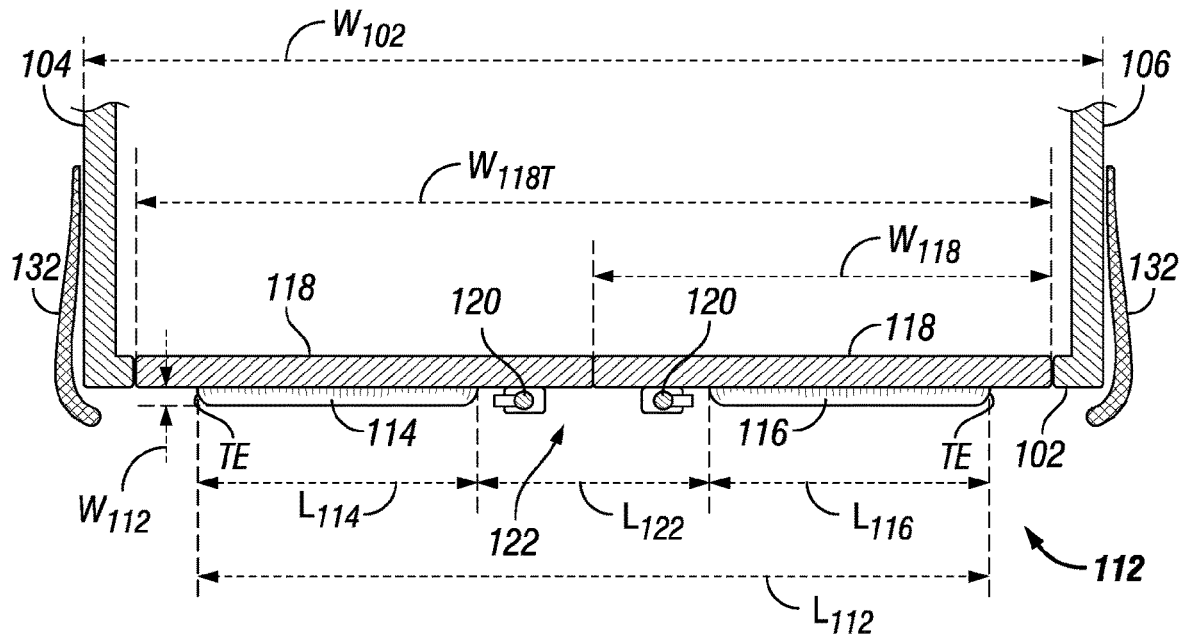
FIG. 3 is a top view of the rear end of the land vehicle of FIG. 1 with the wake disruptor arranged along the rear end of the land vehicle.

With reference to an exemplary embodiment shown in FIGS. 1-3, a land vehicle 100 comprising a trailer is shown with a wake disruptor 112 attached to a rear side 102 thereof. The land vehicle or trailer 100 has a length extending between a front end (not shown) and a rear end 102. Vehicle 100 also includes a left side 104 and a right side 106, the right side 106 arranged opposite the left side 104 to define a width of the land vehicle 100. Land vehicle 100 also includes a top side 108 and a bottom side 110, the bottom side 110 arranged opposite the top side 108 to define a height $H_{100}$ of the land vehicle 100, which may vary along the length of the land vehicle. An overall height $H_{100g}$ of the land vehicle 100 extends from the point of ground contact, which is often the tires, to the top side 108. Rear side 102 has a height $H_{102}$ extending from the point where the top side 108 of the land vehicle 100 and the rear side 102 intersect to the point where the bottom side 110 and the rear side 102 intersect. Note, a bumper 119a extending downward from bottom side 110 at the rear side 102 via extensions 119b is not included within the defined rear side height $H_{102}$ as air flowing along the bottom side of the land vehicle 100 flows above the bumper and the bottom side 110. Further, height $H_{102g}$ defines the overall height of the rear side relative a ground surface, taken from the point where the top side 108 and the rear side 102 intersect to a point of contact with the ground surface. A clearance height $H_C$ is defined as a distance extending between the ground surface and the bottom side 110 of land vehicle 100.

Optionally, the land vehicle or trailer 100 may include one or more doors on the rear side of the land vehicle 100. In the exemplary embodiment shown in FIGS. 1-3, as best viewed in FIGS. 2 and 3, rear side 102 of the land vehicle 100 includes a pair of doors 118 arranged side-by-side in a direction of the rear side width $W_{102}$. Doors 118 each have a top $118_a$ and a bottom $118_b$ that define a height $H_{118}$ of each door 118 as well as a total height $H_{118T}$ that the combination of doors 118 span (as it is contemplated that two or more doors 118 may be stacked in a direction of the rear side height $H_{102}$, in lieu of being arranged side-by-side in a direction of the rear side width $W_{102}$ as exemplary shown). Height $H_{118g}$ is the distance between the ground surface and bottom $118_b$ of door 118, and height $H_{112-118}$ is the distance between door bottom $118_b$ and the bottom of a wake disruptor 112. Each door 118 also has a width $W_{118}$ and the combination of doors 118 have a collective width $W_{118T}$ spanning the rear side 102. With reference to further exemplary embodiments shown in FIGS. 10 and 11, a single door 118 is employed in lieu of a pair of doors 118. In addition to one or more doors 118, rear side 102 may include door hardware for opening, closing, securing, or latching the doors 118 in any open or closed arrangement, such as vertical bars 120. Vertical bars 120 extend in a direction of the door height $H_{118}$ and intersect length $L_{112}$ of the wake disruptor 112.

Turning now to the wake disruptor, the wake disruptor forms a projection extending outwardly from the rear side, having a thickness extending at least partially in a direction of the height of the rear side, a length extending at least partially in a direction of the land vehicle width. The length is defined by a pair of opposing, spaced apart terminal ends of the wake disruptor. The width of the wake disruptor, in extending outwardly from the read side, extends at least partially in a direction of the land vehicle length. In the exemplary embodiment shown in FIGS. 1-3, an exemplary wake disruptor 112 is shown. Wake disruptor 112 has a length $L_{112}$ extending between opposing terminal ends TE and in the direction of the rear side width $W_{102}$, between left and right sides 104, 106 of the land vehicle (trailer). The wake disruptor 112 further has a width $W_{112}$ extending outwardly from the rear side 102, and more specifically from a vehicle-engaging side of the wake disruptor 112 to an outward-facing side of the wake disruptor 112, wherein the vehicle-engaging end of the wake disruptor 112 is in contact with the land vehicle 100. Still further, the wake disruptor 112 has a thickness $T_{112}$, the thickness $T_{112}$ extending between a bottom side and a top side of the wake disruptor 112.

Figure 5:
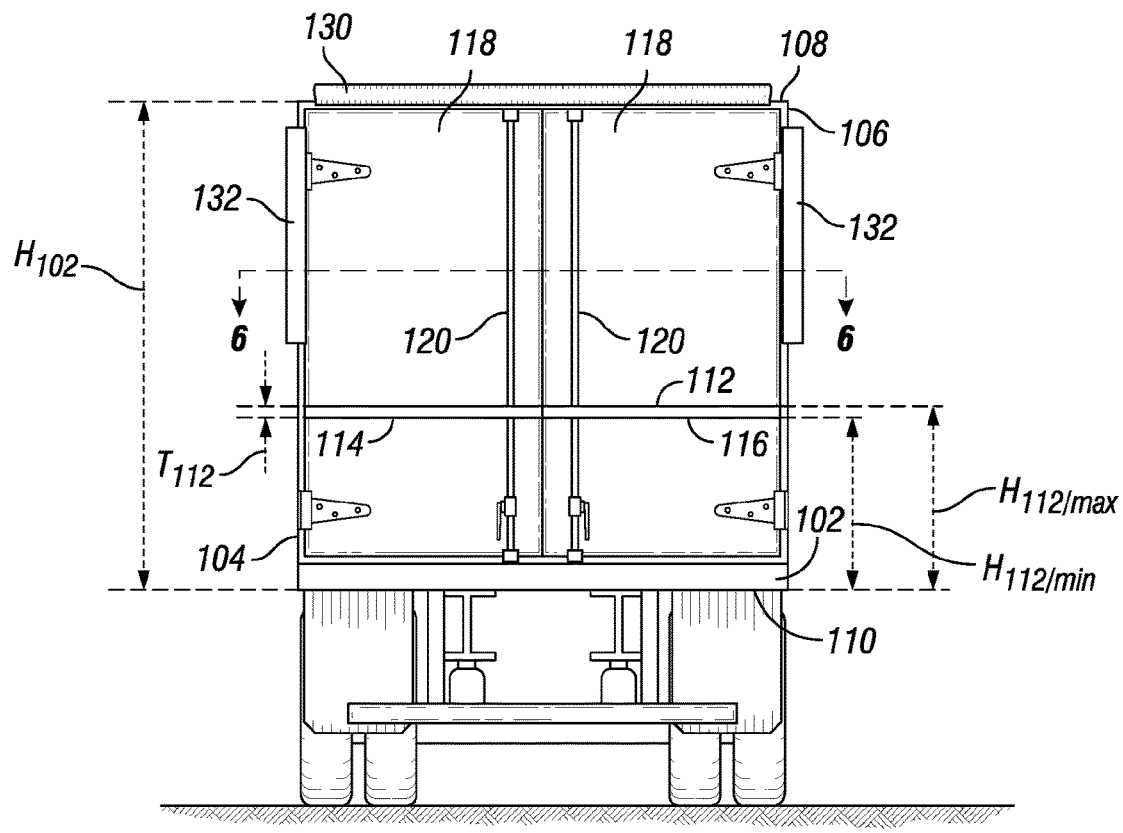
FIG. 5 is a rear view of a land vehicle with a wake disruptor arranged along the rear end of the land vehicle, according to yet another embodiment.
Figure 6:
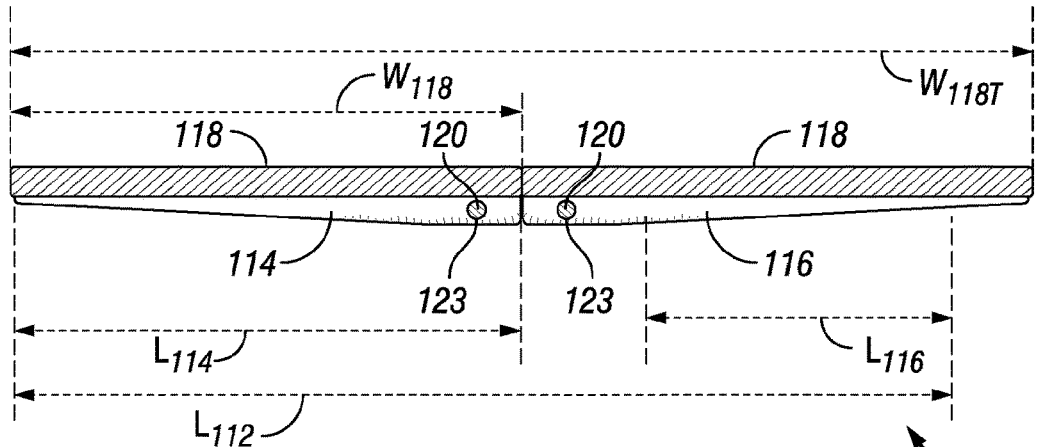
FIG. 6 is a top view of the land vehicle of FIG. 5 with the wake disruptor arranged along the rear end of the land vehicle.

It is appreciated that the length of the wake disruptor may be continuous or discontinuous. When discontinuous, one or more gaps (spacings) are arranged along the length of the wake disruptor. With reference to the exemplary embodiment shown in FIGS. 2-3, wake disruptor length $L_{112}$ is discontinuous, as it has a gap 122 forming a void and having a length L122. In this instance, gap 122 is provided to provide a void through which vertical bars 120 pass. In certain embodiments, it is advantageous to reduce the gap to a distance of 1 to 3 inches, or even to eliminate the gap where the wake disruptor length is continuous. For example, with reference to the exemplary embodiment shown in FIGS. 5 and 6, a wake disruptor 112 is shown having a continuous length $L_{112}$, even though the length $L_{112}$ is sectioned into two portions since the portions abut one another. Also note, in this embodiment, holes 123 are provided through which vertical bars 120 pass. These holes 123 are optional, as they are provided to permit passage of an object when present, such as the vertical bars, in lieu of providing a gap 122, such as is shown in FIGS. 2-3. When utilizing a gap to permit passage of an object intersecting a length of the wake disruptor, one or more spacers may be arranged within the gap to fully or partially fill or span the gap, while also permitting passage of an object if present. By example, with reference to FIG. 7, a spacer 117 is arranged along the wake disruptor length $L_{112}$ to partially fill the void between vertical bars 120 such that, in particular exemplary embodiments, any gap is limited to a length of 1 to 3 inches.

Although the one or more spacers are separate from other portions of the wake distributor, each may be spaced apart from, overlap with, or abut portions of the wake disruptor adjacent the gap and/or another spacer. It is also appreciated that each spacer may be rigid or flexible. For example, in certain instances the spacer is a thin, rigid connector, which operates as an insert. In other embodiments, to eliminate any gap, one or more of the one or more spacers may each form a flexible flap arranged to span the gap, each of which may be positionable between installed and uninstalled arrangements. Each flap may abut or overlap any opposing end or edge of the wake disruptor and/or overlap another flap. The flap may be formed of any flexible material, such as a textile material.

When a gap is provided, a wake disruptor can be described as having two or more portions, where the gap parses an otherwise continuous wake disruptor (that is a wake disruptor free of any gaps) into separate portions. For example, with reference again to the embodiment in FIGS. 2 and 3, wake disruptor 112 comprises a first portion 114 having a length $L_{114}$ and a second portion 116 having a length L116, the first and second portions 114, 116 being spaced apart along the wake disruptor length $L_{112}$ by gap 122. It is contemplated that each portion may be of the same design or different. For example, in FIGS. 2 and 3, first and second portions 114, 116 are of the same design. It is also contemplated that the different portions may be arranged symmetrically or asymmetrically along the rear side relative to any reference, such as a vertically extending centerline. Again, by example, with reference to the embodiment in FIGS. 2 and 3, first and second portions 114, 116 are arranged symmetrically along the rear side 102 relative to a vertically extending centerline.

Figure 4:
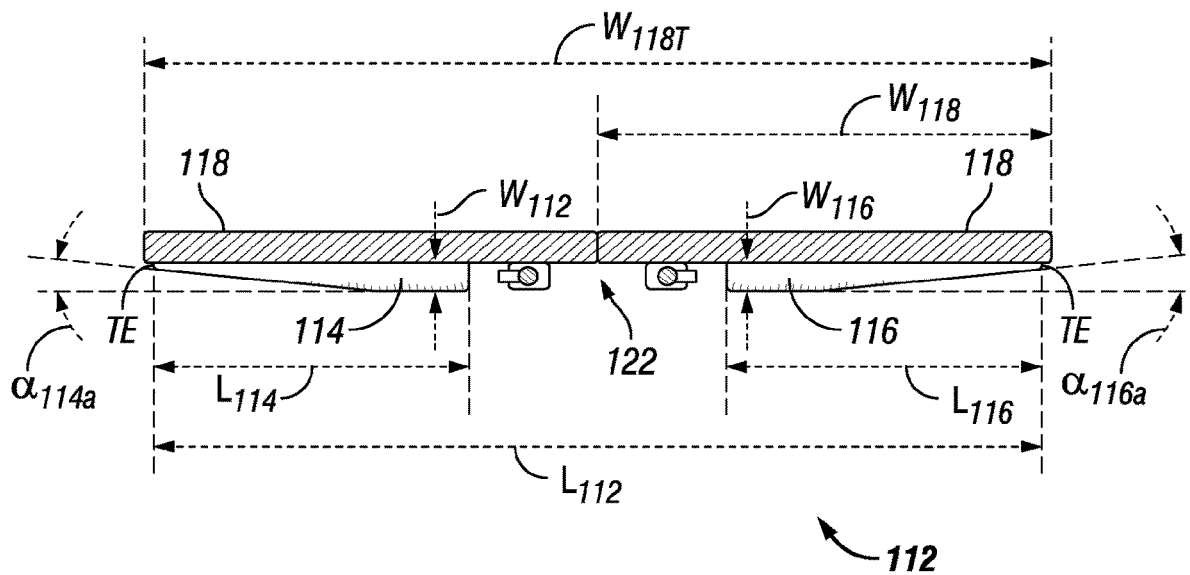
FIG. 4 is a top view of a rear end of a land vehicle with a wake disruptor arranged along the rear end of the land vehicle, according to an additional embodiment.

As noted previously, any width and/or thickness may vary over a length of the wake disruptor. With reference to the exemplary embodiment of FIGS. 2 and 3, wake disruptor 112 of constant width $W_{112}$ and thickness $T_{112}$ is provided. With reference to another exemplary embodiment in FIG. 4, wake disruptor 112 has a variable width $W_{112}$, and more specifically, wake disruptor 112 tapers in width $W_{112}$ by narrowing as portions of the length approach each opposing terminal end TE of the wake disruptor 112. More specifically, an outward portion of the length of each first portion 114 and second portion 116 of the wake disruptor 116 narrow in a tapered manner as each approaches a corresponding outer terminal end TE or extent of the wake disruptor 112. This widthwise tapering is characterized in first portion 114 by angle $\alpha_{114a}$ and in and the second portion 116 as angle $\alpha_{116a}$ measured relative the widthwise direction of the land vehicle 100 (which is perpendicular to the land vehicle length and height) or lengthwise direction of the wake disruptor 112 (which his perpendicular to its width and height). One reason for this tapering is to provide sufficient clearance and permit the doors 118 to rotationally open as much as possible as each approaches corresponding left and right sides 104, 106 of the land vehicle 100. Accordingly, in certain embodiments, angles $\alpha_{114a}$ and $\alpha_{116a}$ are calculated after determining the desired fully open position of the doors 118. In exemplary embodiments, angles $\alpha_{114}$ and $\alpha_{116}$ are 2 to 10 degrees and in more specific embodiments substantially four degrees. Although this narrowing occurs after a more central portion (span) of the length is characterized as having a constant width, it is contemplated that the width can narrow from a central location of the wake disruptor such that no portion of the length remains constant across its width.

It is appreciated that the length of the wake disruptor may extend partially or substantially across the width of the rear side. "Substantially across the width of the rear side" means fully extending across the width of the rear side or within a manufacturing tolerance of fully extending. In doing so, the wake disruptor length may extend across any door if present and any structure surrounding any door present. It is also appreciated that the length of the wake disruptor may extend partially or substantially across the width of the doors. In extending substantially across the width of the doors means that the length of the wake disruptor, as defined by the opposing, outer terminal ends of the wake disruptor, extends fully across the collective width spanning all doors arranged side-by-side across the rear side of the vehicle or within a manufacturing tolerance of fully across. In the exemplary embodiments of FIGS. 2 and 3, wake disruptor length $L_{112}$ extends partially across the width $W_{102}$ of rear side 102 and partially across the collective width $W_{118T}$ spanned by the doors 118. In the embodiment shown in FIG. 4, wake disruptor length $L_{112}$ extends substantially across the combined width $W_{118T}$ of the doors 118, although the wake disruptor 112 is discontinuous along its length $L_{112}$ (that is, it has a central gap 122). With reference now to the embodiment of FIGS. 5 and 6, wake disruptor length $L_{112}$ extends substantially across the combined width $W_{118T}$ of the doors 118 while the wake disruptor 112 is continuous along its length $L_{112}$ (that is, no central gap 122 is present). In the embodiment shown in FIG. 7, wake disruptor length $L_{112}$ extends partially across the combined width $W_{118T}$ of the doors 118, although the wake disruptor 112 is discontinuous along its length $L_{112}$, as it has a central gap 122 partially filled by one or more spacers 117. Finally, with reference to the embodiments shown in FIGS. 8-11, each wake disruptor length $L_{112}$ extends partially across the combined width $W_{118T}$ of the doors 118, although the wake disruptor 112 is continuous along its length $L_{112}$ (that is, no central gap 122 is present).

Figure 8:
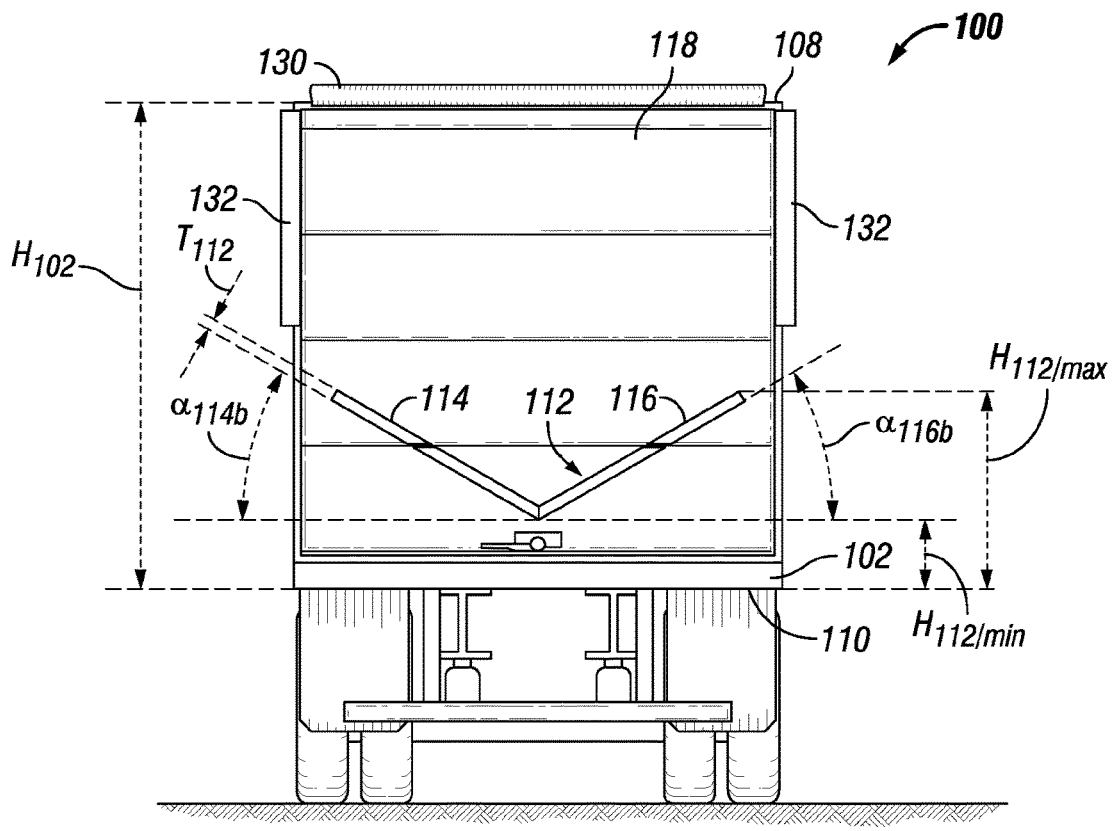
FIG. 8 is a rear view of a land vehicle with a wake disruptor arranged along the rear end of the land vehicle, according to an additional embodiment.
Figure 9:
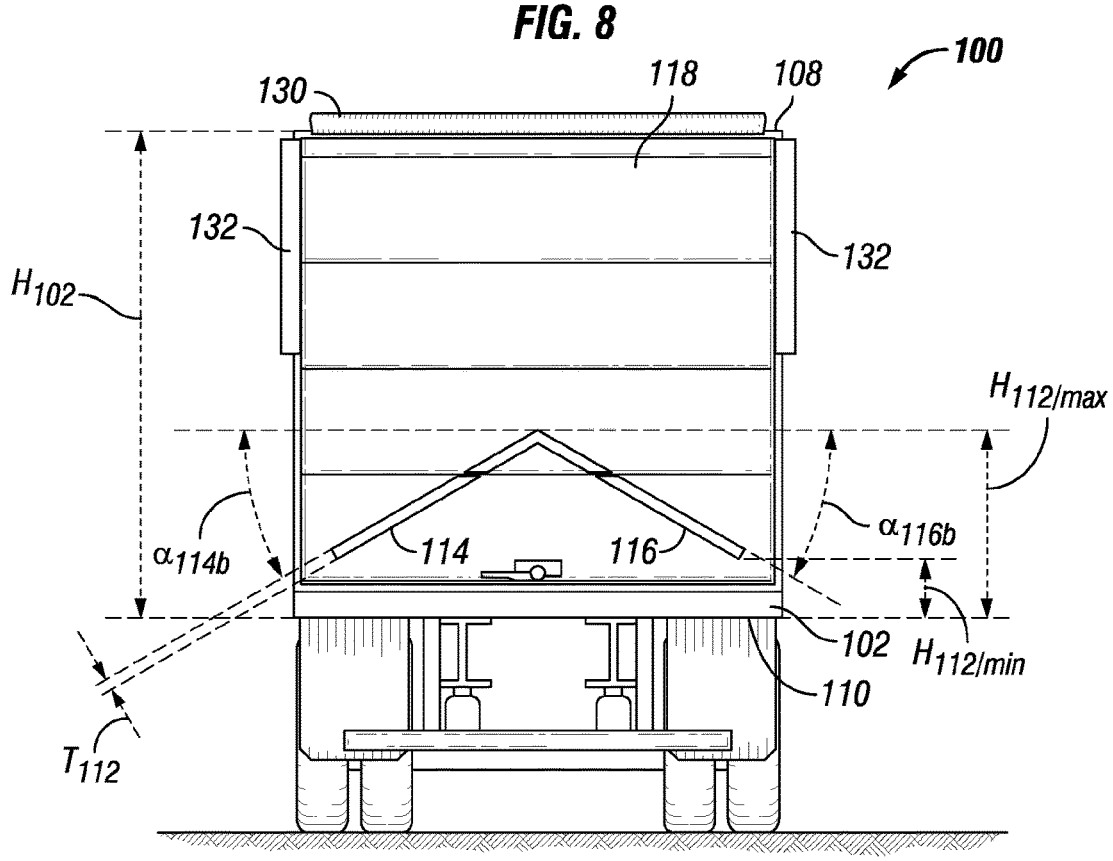
FIG. 9 is a rear view of a land vehicle with a wake disruptor arranged along the rear end of the land vehicle, according to an additional embodiment.
Figure 10:
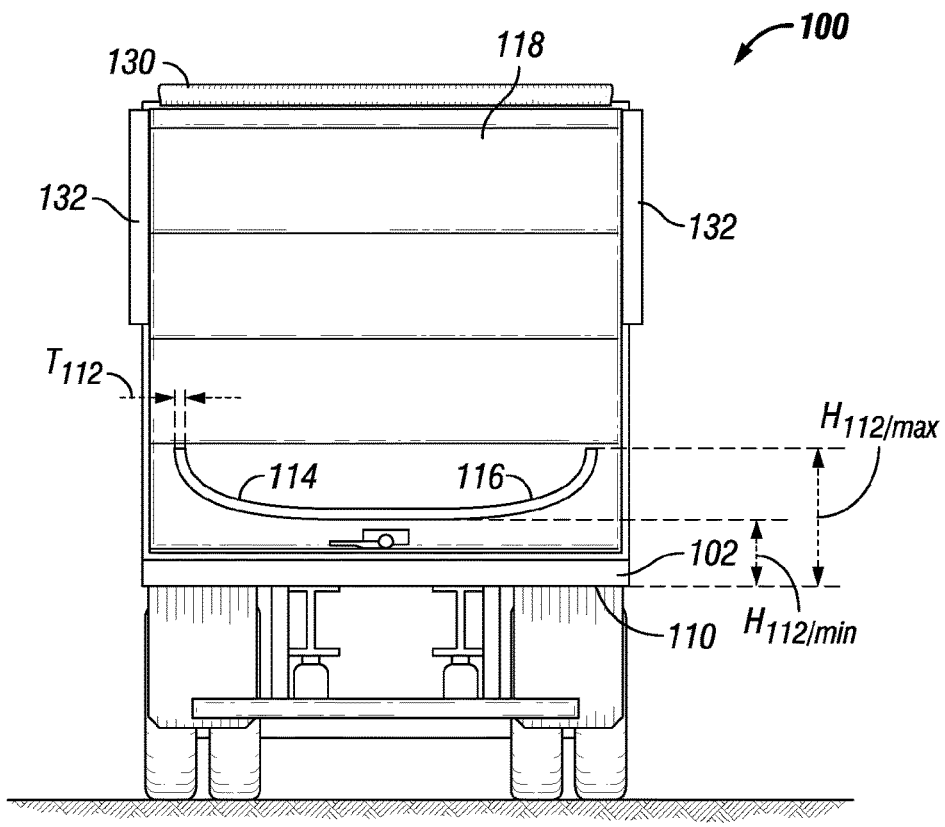
FIG. 10 is a rear view of a land vehicle with a wake disruptor arranged along the rear end of the land vehicle, according to an additional embodiment.
Figure 11:
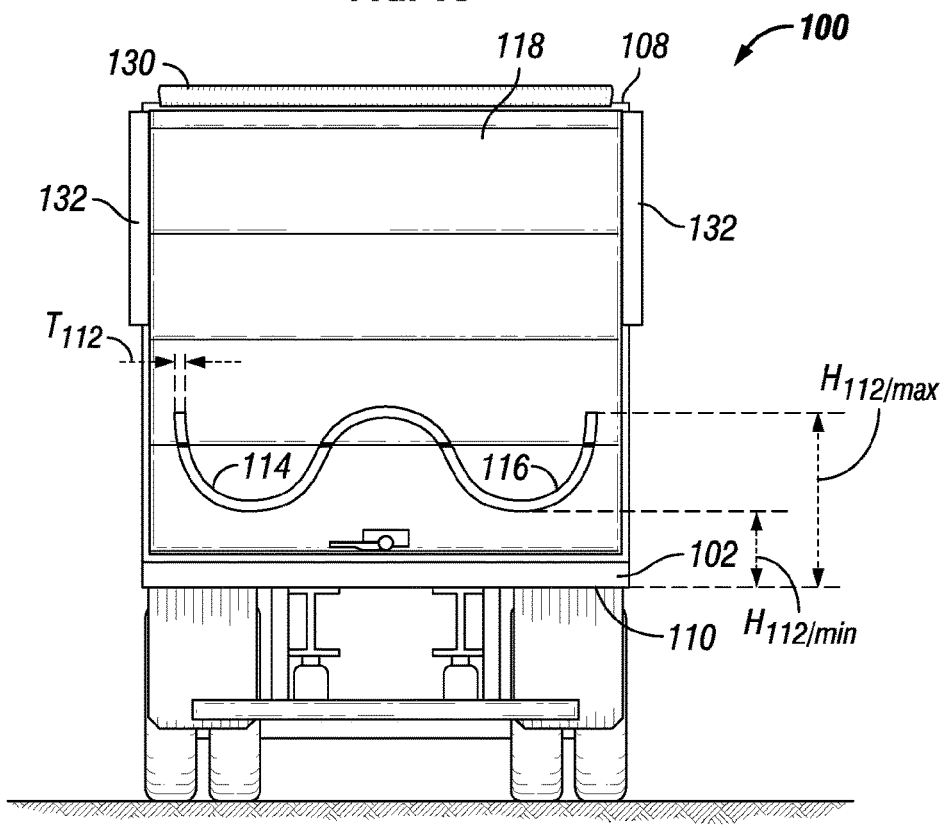
FIG. 11 is a rear view of a land vehicle with a wake disruptor arranged along the rear end of the land vehicle, according to an additional embodiment.
Figure 18:
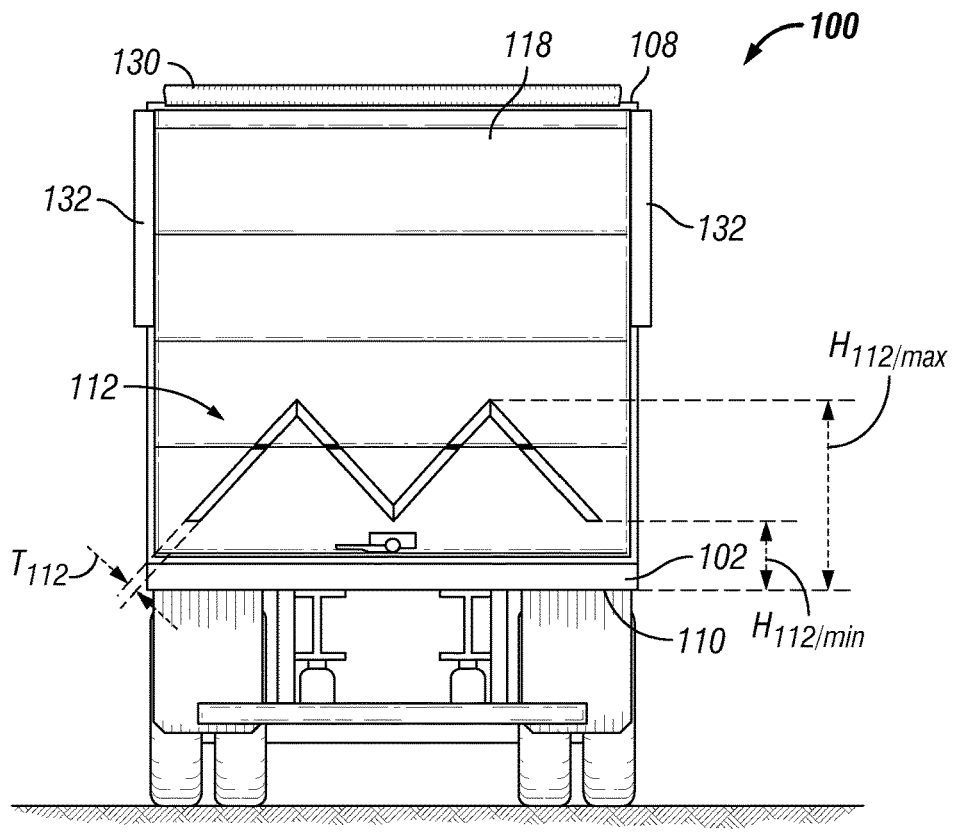
FIG. 18 is a rear view of a land vehicle with an inverted W-shaped wake disruptor arranged along the rear end of the land vehicle, according to an additional embodiment.
Figure 19:
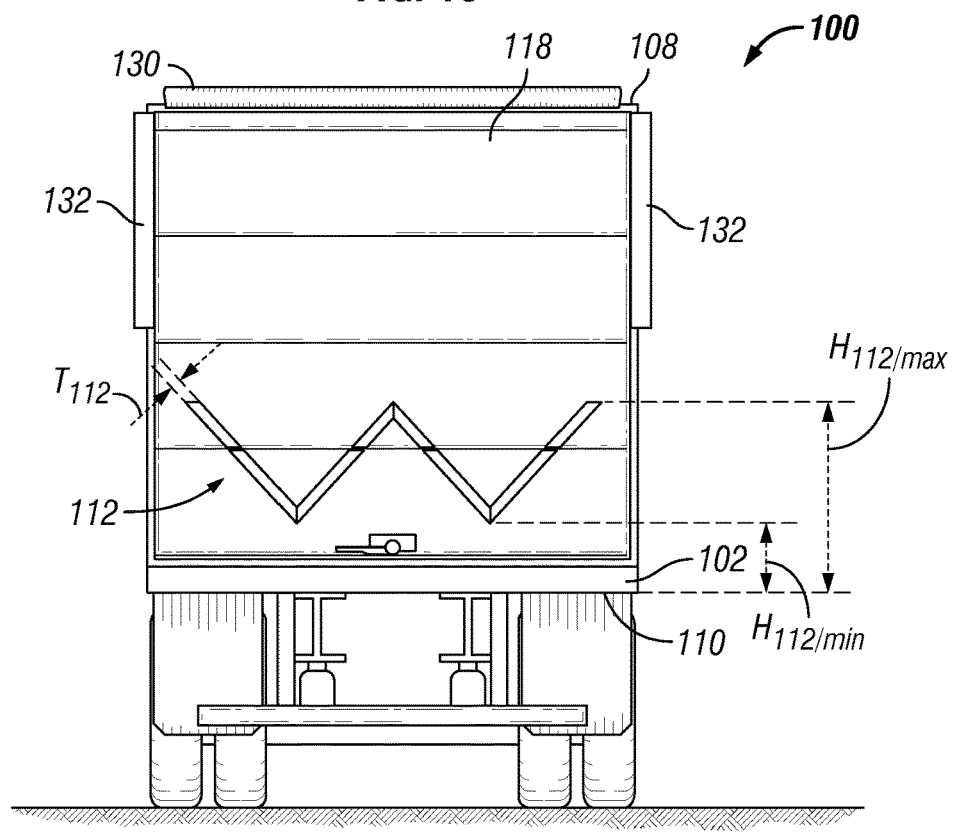
FIG. 19 is a rear view of a land vehicle with a W-shaped wake disruptor arranged along the rear end of the land vehicle, according to an additional embodiment.

It is appreciated that the length of the wake disruptor may extend linearly or non-linearly. With reference to the embodiments shown in FIGS. 1-7, the length $L_{112}$ of each wake disruptor 112 extends linearly across the rear side 102 of the land vehicle 100, where the lengths of portions 114 and 116 are aligned to extend linearly along a common length $L_{112}$ (that is, along a common linear path). With reference now to the embodiments shown in FIGS. 8-11 and 18-19 different embodiments of wake disruptor 112 extend lengthwise along different non-linear paths. For example, in FIG. 8, wake disruptor 112 is V-shaped, as the length $L_{112}$ of wake disruptor extends along a V-shaped path. In FIG. 9, in an alternative embodiment, wake disruptor 112 is arranged in an inverted V-shape, as the length $L_{112}$ of wake disruptor 112 extends along an inverted V-shaped path. In each embodiment shown in FIGS. 8 and 9, first portion 114 and second portion 116 forming wake disruptor 112 are each angled elevationally along rear side 102, and more specifically doors 118, such that first and second portions 114, 116 increase or decrease in elevation by angles $\alpha_{114b}$ and $\alpha_{116b}$, respectively, relative a widthwise direction of the rear side 102. In exemplary embodiments, these angles $\alpha_{114}$ and $\alpha_{116}$ are between five and forty-five degrees. Referring now to FIG. 10, wake disruptor 112 is U-shaped, as the length $L_{112}$ of wake disruptor extends along a U-shaped path. With reference to FIG. 11, wake disruptor 112 is W-shaped, as the length $L_{112}$ of wake disruptor extends along a W-shaped path, where such path as shown can be described as a sinusoidal, curvilinear, or non-linear path. Of course, other paths are contemplated and may be employed as desired. In the embodiment of FIG. 18, the wake disruptor 112 is arranged in the form of an inverted W-shape, where the length $L_{112}$ of wake disruptor extends along an inverted W-shaped path formed of a plurality of linear segments. Finally, with reference to FIG. 19, the wake disruptor 112 is W-shaped, as the length $L_{112}$ of wake disruptor extends along a W-shaped path, but where such path is formed of a plurality of linear segments.

In each embodiment shown in the FIGURES, the wake disruptor 112 is arranged at a height, and more specifically at a maximum height $H_{112/max}$, at or below a midpoint of the height $H_{102}$ of the land vehicle rear side 102 and at least at a height, and more specifically a minimum height $H_{112/min}$, greater than or equal to ten percent (10%) of the height $H_{102}$ of the rear side 102. Also, in the embodiments shown, the wake disruptor 112 is arranged at a height $H_{112/max}$ at or below a midpoint of the height $H_{118}$ of each door 118 on the land vehicle rear side 102 and at least at a height $H_{112/min}$ (shown in FIG. 2 as $H_{112\text{-}110}$ greater than or equal to ten percent (10%) of door height $H_{118}$. This arrangement relative the door height is optional based upon the presence and configuration of any one or more doors. Additionally, but optionally, in certain embodiments, such as shown in FIG. 1, the wake disruptor 112 is arranged at a minimum height 28 to 32 inches elevationally above a side skirt 124 located on a left or right side 104, 106 of a land vehicle 100. In any event, the width $W_{112}$ of the wake disruptor 112, and therefore the width of any first portion 114 and second portion 116 of the wake disruptor 112, is equal to 1.5 to 8.0 inches or in other variations, 2 to 4 inches. In more specific instances, the wake disruptor is arranged at least 59 inches above the ground and up to 104 inches above ground, such as when, for example, the wake disruptor is arranged on a trailer rear side having an overall height as measured from the ground of 13 feet 6 inches (162 inches) having a pair of 111 inch high doors where the bottom of the doors are located 48.5 inches above the ground.

Figure 7:
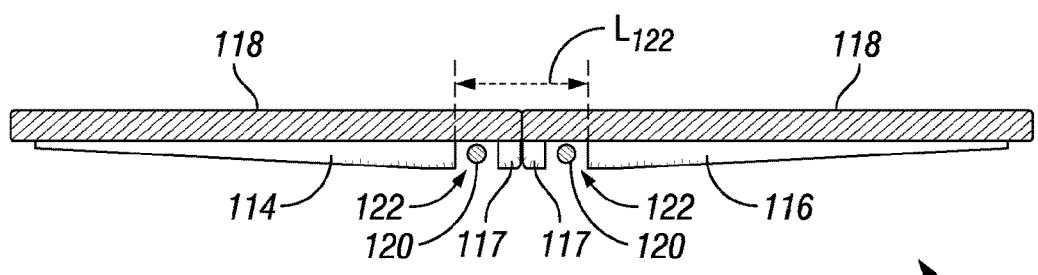
FIG. 7 is a top view of a rear end of a land vehicle with a wake disruptor arranged along the rear end of the land vehicle, according to an additional embodiment.
Figure 16:
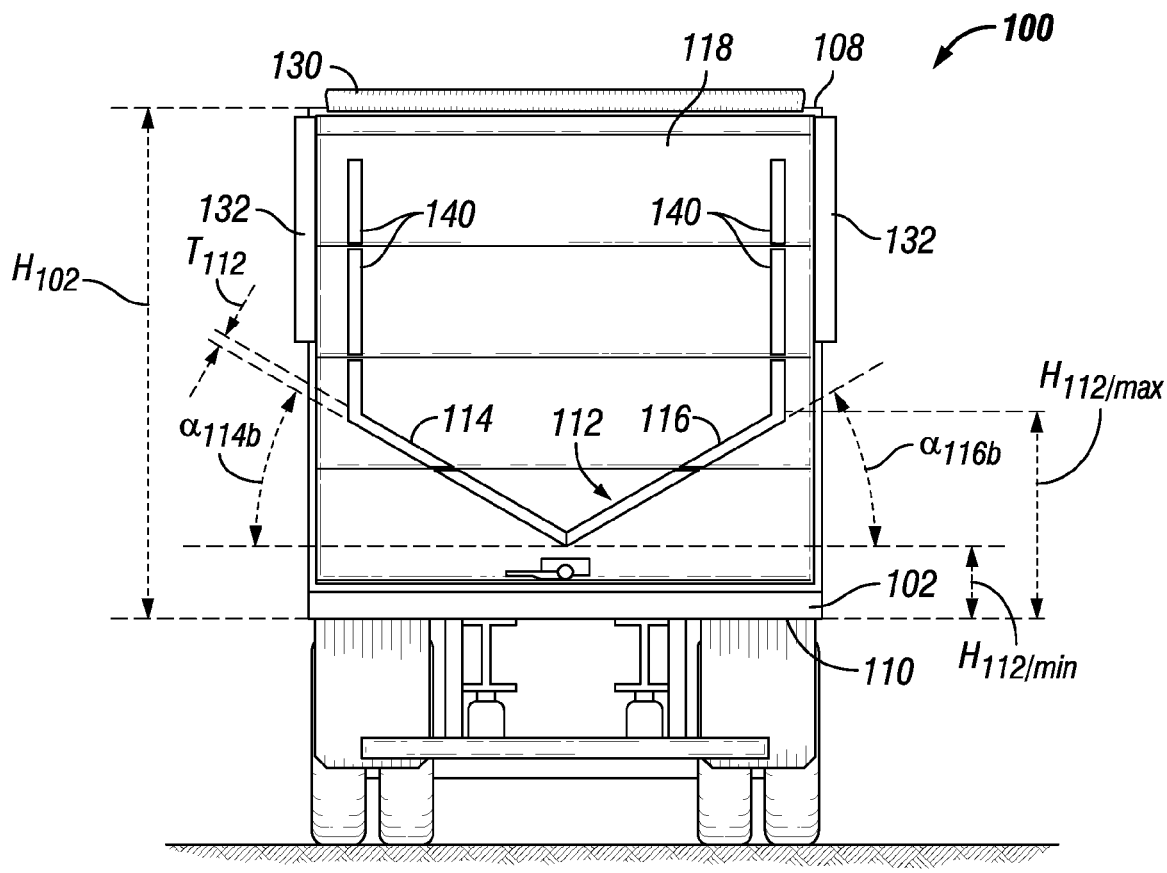
FIG. 16 is a rear view of a land vehicle with a wake disruptor arranged along the rear end of the land vehicle, where the embodiment of FIG. 8 has been modified to include vertical extensions in accordance with another embodiment.
Figure 17:
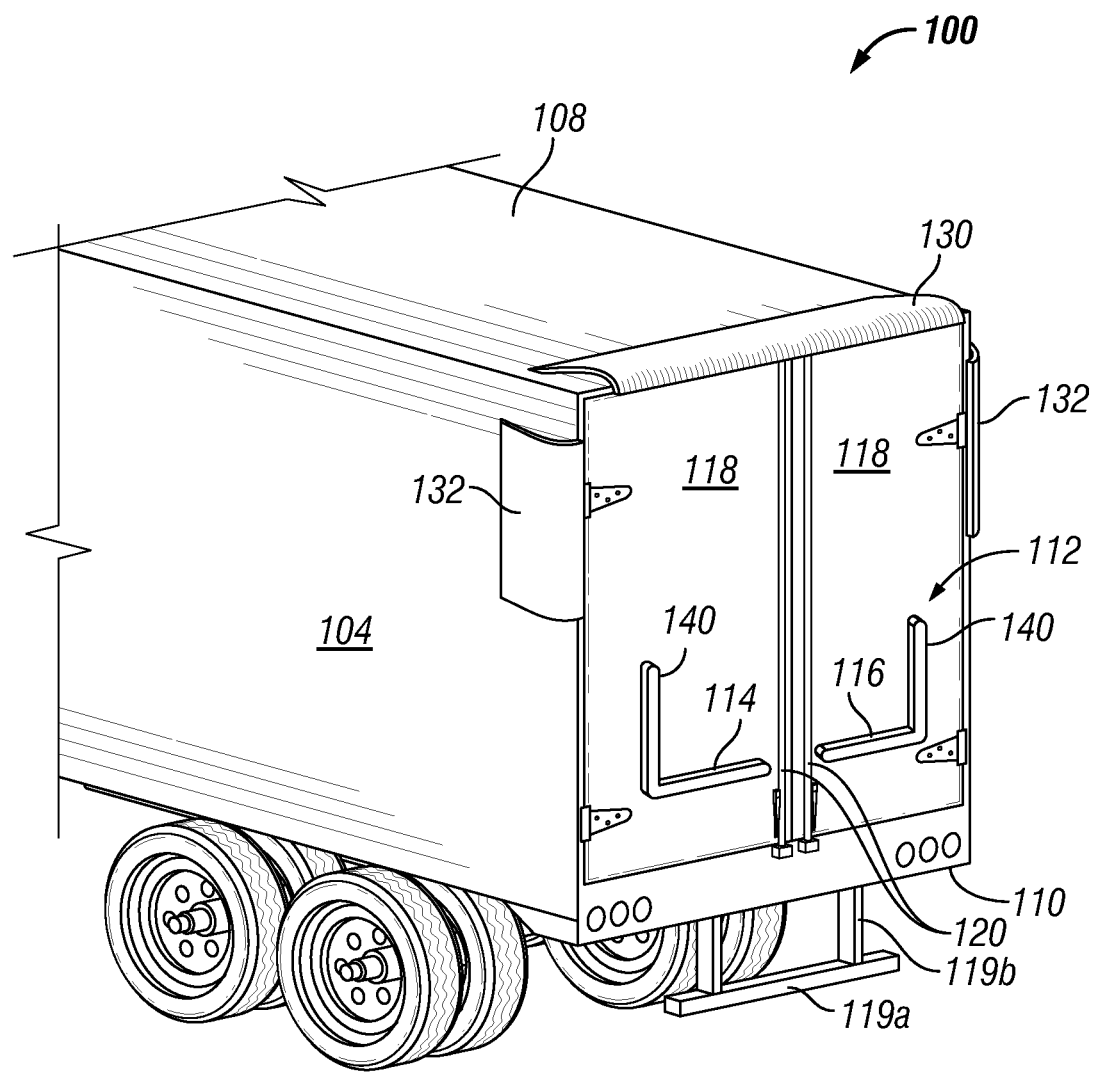
FIG. 17 is a rear perspective view of a land vehicle with a wake disruptor arranged along the rear end of the land vehicle, where the embodiment of FIG. 2 has been modified to include vertical extensions in accordance with another embodiment.

It is appreciated, that in arranging a wake disruptor below a certain location of the land vehicle, such as below the midpoint of the rear side or any door, for example, as otherwise described herein, in certain instances the entire wake disruptor is arranged below the certain location while in other instances one or more horizontal portions of a wake disruptor are each located below the certain location. A horizontal portion of a wake disruptor is a portion of the wake disruptor that extends substantially in a horizontal direction, that is, substantially in the direction of the land vehicle width, which means that the length of the horizontal portion extends in a direction that is 45 degrees or less, in absolute value, relative the direction of the land vehicle width. For example, with reference to the embodiments shown in FIGS. 1-7, portions 114, 116, as well as spacers 117 in FIG. 7, are horizontal portions of wake disruptor 112, as each extends in the direction of the land vehicle width (and in each such instance, entirely in the direction of the land vehicle width). In FIGS. 8 and 9, each portion 114, 116 is a horizontal portion when each corresponding angle $\alpha_{114b}$, $\alpha_{116b}$ is equal to or less than 45 degrees, in absolute value, meaning from 0 to +/−45 degrees. In each instance, a vertical extension (also referred to as a vertical portion) may optionally be included to extend substantially vertically, that is, at an angle greater than 45 degrees and up to 90 degrees, in absolute value, relative to the direction of the land vehicle width (a widthwise direction of the land vehicle), where this angle is akin to angles $\alpha_{114b}$, $\alpha_{116b}$ for the horizontal portions 114, 116 in the embodiments shown in FIGS. 8 and 9. Stated differently, any vertical extension extends lengthwise less than 45 degrees, in absolute value, that is, from 0 and up to, but not including, +/−45 degrees, relative to the direction of the land vehicle height. These vertical extensions can remain below any certain location contemplated herein for the wake disruptor, such as below the midpoint of the rear side or any door, for example, or may extend at or above any such certain location. In an exemplary embodiments shown in FIGS. 16 and 17, vertical extensions 140 extend from outward terminal ends of each horizontal portion 114, 116. While each vertical extension 140 is shown to extend lengthwise purely in the direction of the land vehicle height, in other variations, the length of any one or both could be biased from the direction of the land vehicle height by less than 45 degrees, in absolute value. It is also contemplated that the length of any vertical portion may extend linearly (shown) or non-linearly. It is noted that just like the horizontal portion, any vertical extension may extend continuously along its length or may be formed of a plurality of segments or portions. For example, in FIG. 16, each vertical extension 140 is formed from a plurality of segments, so to permit the door to open and close, as the door is formed of multiple sections. In other variations, such as shown in the embodiment of FIG. 17, continuous vertical extensions could be employed, since each door shown would permit the use of continuous vertical extensions in association with a corresponding horizontal portion 114, 116. It is also appreciated that any one or more vertical extensions may be added to any embodiment contemplated or described herein. For example, a vertical extension could also be added to the embodiments shown in FIGS. 10 and 11. In fact, vertical extensions may form the upper extensions or legs of a "U" shaped wake disruptor, for example. It is also appreciated that these vertical extensions may be arranged at the terminal ends of any horizontal portion or from any other location along the length of any horizontal portion. Of particular note, the wake disruptors 112 shown in FIGS. 10 and 11 includes portions 114 and 116 that are deemed horizontal portions even though the length of each follows a non-linear path. In certain instances, each portion 114, 116 is horizontal because no portion of the path extends at an angle greater than 45 degrees, in absolute value, relative to the width (widthwise direction) of the land vehicle (e.g., see angles $\alpha_{114b}$, $\alpha_{116b}$ in FIGS. 8 and 9 in different embodiments). In other certain instances, even if a portion of the lengthwise extension of any portion 114, 116 extends at an angle greater than 45 degrees, each portion is a horizontal portion if the length of any such horizontal portion extends at an average angle (e.g., see angles $\alpha_{114b}$, $\alpha_{116b}$ in FIGS. 8 and 9 in different embodiments) for the length of each horizontal portion (that is, the lengthwise extension of each horizontal portion) that is equal to or less than 45 degrees, in absolute value, relative to the direction of the land vehicle width.

Figure 12:
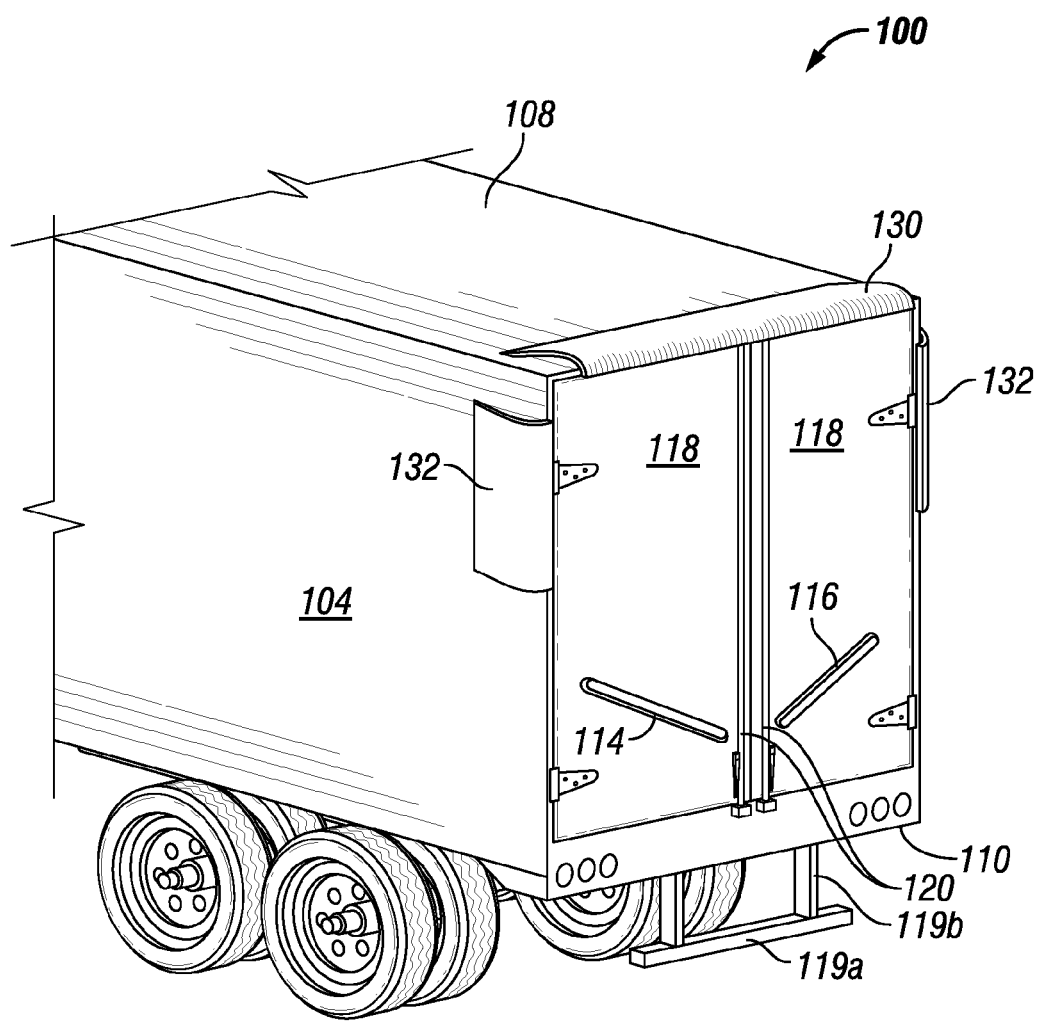
FIG. 12 is a perspective view of a land vehicle with a wake disruptor arranged along the rear end of the land vehicle, according to an additional embodiment.

As noted previously, in certain embodiments, the wake disruptor is used in cooperation with any combination of one or more optional aerodynamic features arranged on the land vehicle. In an exemplary embodiment shown in FIG. 12, the wake disruptor 112 is used in conjunction with various fairings arranged along the top side 108 and left and right sides 104, 106 of the land vehicle 100 where each terminate or intersect with the rear side 102. Specifically, land vehicle 100 includes at least one upper fairing 130 and at least two side fairings 132, each of which are configured to direct the airflow 126 into the area behind rear side 102. The fairings shown reflect the fairings provided with the SmartTruck Top Kit sold by SmartTruck Systems.

Figure 13:
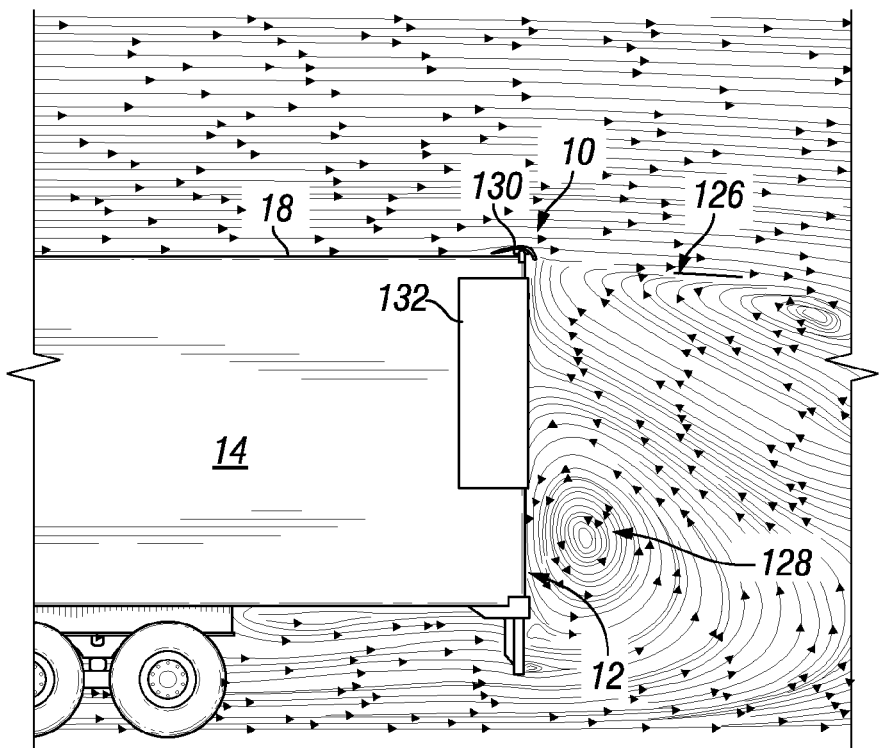
FIG. 13 is a side view of a land vehicle showing an airflow pattern according to the prior art.
Figure 14:
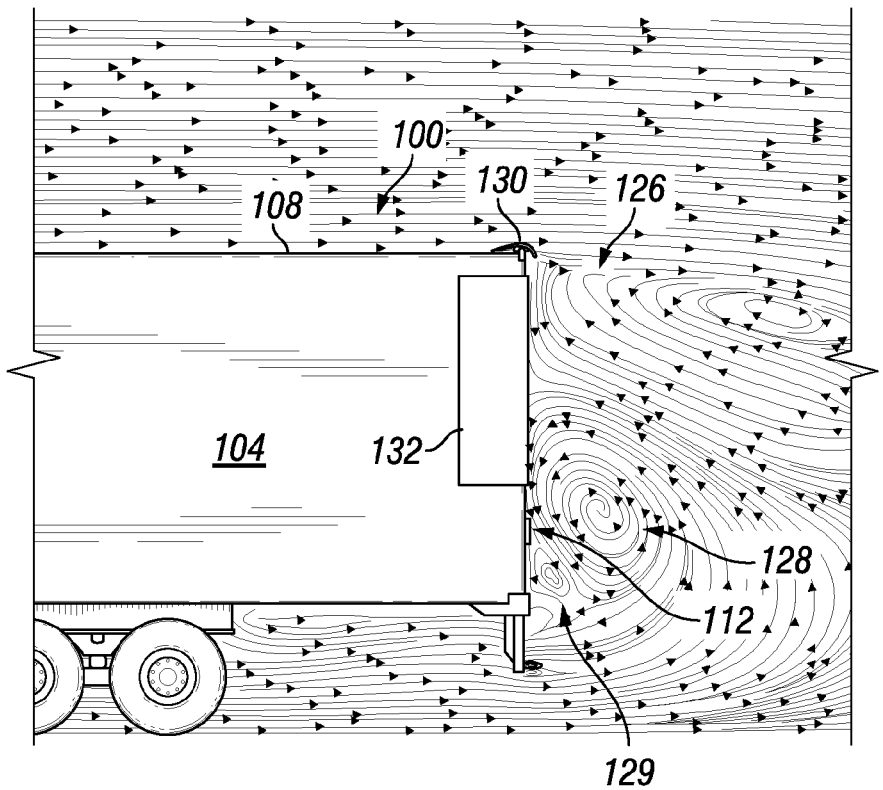
FIG. 14 is a side view of a land vehicle with a wake disruptor showing an airflow pattern, according to a particular embodiment.

In use, the wake disruptors contemplated herein are used to reduce drag for a corresponding land vehicle. Prior attempts at decreasing aerodynamic drag are shown in FIG. 13. Here, a land vehicle 10 having a rear side 12, a left side 14, and a top side 18 is shown employing the fairings shown in FIG. 12 in association with an airflow generated under normal highway speeds of 60 to 65 miles per hour (mph). In this situation, airflow 126 forms a large and concentrated recirculation zone 128, also referred to herein as a vortex. In FIG. 14, a wake disruptor 112 as contemplated herein is shown arranged along the rear side of the vehicle of FIG. 13 as contemplated herein. As can be seen in FIG. 13, the size of the recirculation zone 128 is much larger than the size of the same recirculation zone 128 resulting from the use of a wake disruptor 112, as exemplarily shown in FIG. 14. It is also noted that the airflow velocity in the recirculation zone of FIG. 13, which in the location of the wake disruptor is approximately one-half the free stream velocity or around 30 mph, is much larger than the airflow velocity in the recirculation zone of FIG. 14 where directly below the disruptor the velocity drops to negligible velocities. It is additionally observed that airflow 126 is separated to form a second recirculation zone 129. As a result of using a wake disruptor as described herein, smaller recirculation zones 128 and 129 are generated.

Figure 15:
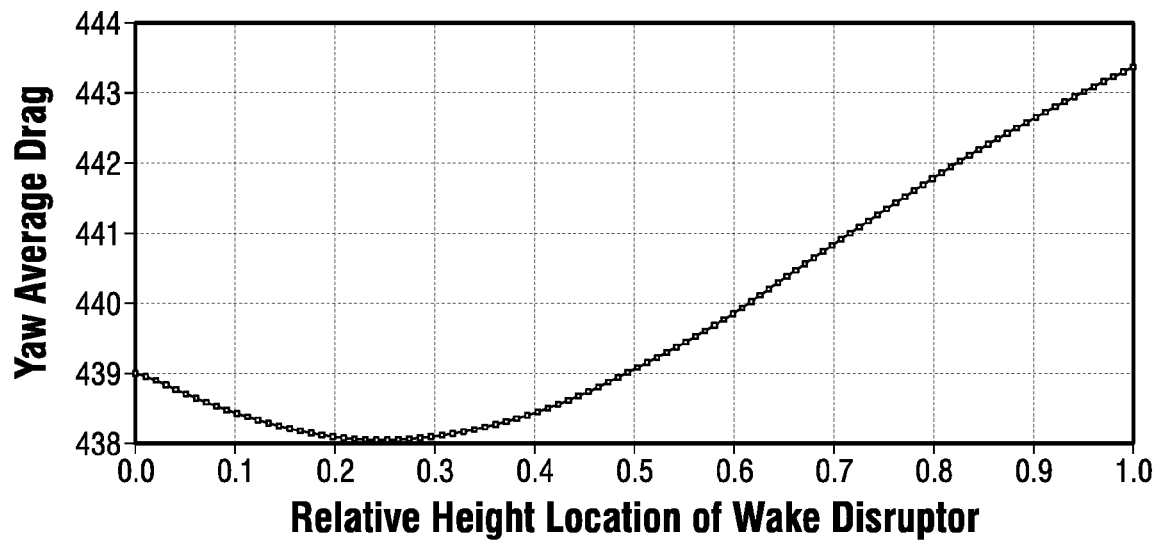
FIG. 15 is a graphical representation illustrating the yaw average drag measured in aerodynamic simulations where a wake disruptor was arranged at different heights along a rear end of a land vehicle.

Certain aerodynamic simulations were performed where the wake disruptor was arranged at different height locations along a rear end of a land vehicle (which as a truck van-style trailer in this instance), which are illustrated in FIG. 15. The X-axis of FIG. 15 illustrates non-dimensional terms, which relate to a span of 10% to 50% of the height of the trailer or rear side of the land vehicle. For example, when X=0.0, this equates to a distance of nine (9) inches above the bottom of the door or top of the bumper of the rear side of the land vehicle. Further, when X=1.0, this equates to a distance of fifty-six (56) inches above the bottom of the door or top of the bumper of the rear side of the land vehicle. The minimum drag (i.e., Yaw Average Drag) is shown on the Y-axis. Thus, as illustrated in FIG. 15, the Yaw Average Drag decreases as the height of the wake disruptor is raised from 9.0 inches to 18.4 inches above the bottom of the door or top of the bumper of the rear side of the land vehicle and then increases as the height of the wake disruptor is raised from 18.4 inches to 56.0 inches above the bottom of the door or top of the bumper of the rear side of the land vehicle.

In an additional test within a wind tunnel utilizing the wake disruptor of the present application, it was found that adding the wake disruptor of the present application to a rear side of a land vehicle reduces the drag for any given Yaw angle between zero and nine degrees. In this test, the bottom-most point of the bottom side of the wake disruptor was arranged at a height of 18.5 inches above the bottom of the rear side of the land vehicle. Additionally, the top-most points of the top side of the wake disruptor were arranged at a height of 31 inches above the bottom of the rear side of the land vehicle.

To the extent used, the terms "comprising," "including," and "having," or any variation thereof, as used in the claims and/or specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the embodiments. Ranges that are described as being "between a and b" are inclusive of the values for "a" and "b" unless otherwise specified.

While various improvements have been described herein with reference to particular embodiments thereof, it shall be understood that such description is by way of illustration only and should not be construed as limiting the scope of any claimed invention. Accordingly, the scope and content of any claimed invention is to be defined only by the terms of the following claims, in the present form or as amended during prosecution or pursued in any continuation application. Furthermore, it is understood that the features of any specific embodiment discussed herein may be combined with one or more features of any one or more embodiments otherwise discussed or contemplated herein unless otherwise stated.

What is claimed is:

1. A method of using a wake disruptor to reduce drag of a land vehicle, the method comprising:
   providing a land vehicle having a front side spaced apart from a rear side to define a length of the land vehicle, a left side spaced apart from a right side to define a width of the land vehicle, and a top side spaced apart from a bottom side to define a height of the land vehicle;
   arranging a wake disruptor along the rear side of the land vehicle in a configuration to reduce drag of the land vehicle, the wake disruptor forming a protrusion having a width extending outwardly from the rear side by a distance of 1.5 to 8 inches and having a length extending at least partially in a direction of the land vehicle width between a pair of opposing terminal ends, the pair of opposing terminal ends each forming an end with airflow impinging there against,
   where the wake disruptor has one or more linear portions each forming a portion of the wake disruptor length extending in a direction that is 45 degrees or less, in absolute value, relative to the direction of the land vehicle width, where the one or more linear portions are arranged below a midpoint of a height of the rear side of the land vehicle, as measured from the bottom side of the vehicle to the top side of the land vehicle, and at least at a height greater than or equal to ten percent of the rear side height, and
   where the one or more linear portions are arranged to form a V or W-shape, in an upright or inverted arrangement.

2. The method of claim 1, where the rear side includes a door upon which the wake disruptor is arranged, the wake disruptor having one or more linear portions each forming a portion of the wake disruptor length extending substantially in the direction of the land vehicle width, the one or more linear portions being arranged below a midpoint of a height of the door, and at least at a height greater than or equal to ten percent of the door height.

3. The method of claim 1, where the wake disruptor includes one or more vertical extensions each extending substantially in a direction of the land vehicle height, each of the one or more vertical extensions extending from one of the one or more linear portions.

4. The method of claim 3, where the entire wake disruptor is arranged below any such midpoint.

5. The method of claim 1, where the land vehicle includes a pair of side skirts, one of the pair arranged on one of the left and right sides of the land vehicle, and the wake disruptor being arranged elevationally at or between 28 inches and 32 inches above at least one of the pair of side skirts.

6. The method of claim 1, where the wake disruptor extends continuously along its length.

7. The method of claim 1, where the wake disruptor is discontinuous along its length to form a gap between a first portion and a second portion of the wake disruptor, where the rear side includes a pair of doors, where the first portion of the wake disruptor is arranged along one of the pair of doors and the second portion of the wake disruptor is arranged along the other of the pair of doors.

8. The method of claim 1 further comprising:
arranging at least one upper fairing and at least two side fairings on the land vehicle, the at least one upper fairing and the at least two side fairings being configured to redirect the airflow into a wake.

9. The method of claim 1, where the land vehicle is free of any upper fairings arranged along the top side of the land vehicle and any side fairings arranged along either the left side or the right side of the land vehicle.

10. The method of claim 1, where the wake disruptor width tapers along the wake disruptor length and narrows in a direction towards each terminal end.

11. A land vehicle comprising:
a front side spaced apart from a rear side to define a length of the land vehicle;
a left side spaced apart from a right side to define a width of the land vehicle;
a top side spaced apart from a bottom side to define a height of the land vehicle;
a wake disruptor arranged along the rear side of the land vehicle in a configuration to reduce drag of the land vehicle, the wake disruptor forming a protrusion having a width extending outwardly from the rear side by a distance of 1.5 to 8 inches and having a length extending at least partially in a direction of the land vehicle width between a pair of opposing terminal ends, the pair of opposing terminal ends each forming an end configured for airflow to impinge there against during vehicle operation,
where the wake disruptor has one or more non-linear portions each forming a portion of the wake disruptor length extending in the direction of the land vehicle width, where the one or more non-linear portions are arranged below a midpoint of a height of the rear side of the land vehicle, as measured from the bottom side of the vehicle to the top side of the land vehicle, and at least at a height greater than or equal to ten percent of the rear side height.

12. The land vehicle of claim 11, where the rear side includes a door upon which the one or more non-linear portions being arranged below a midpoint of a height of the door, and at least at a height greater than or equal to ten percent of the door height.

13. The land vehicle of claim 11, where the entire wake disruptor is arranged below the midpoint of the height of the rear side of the land vehicle.

14. The land vehicle of claim 11, where the one or more non-linear portions are arranged to form a V or W-shape, in an upright or inverted arrangement.

15. The method of claim 1, where the protrusion width extends outwardly from the rear side by a distance of 2 to 4 inches.

16. The land vehicle of claim 11, where the protrusion width extends outwardly from the rear side by a distance of 2 to 4 inches.

17. A land vehicle comprising:
a front side spaced apart from a rear side to define a length of the land vehicle;
a left side spaced apart from a right side to define a width of the land vehicle;
a top side spaced apart from a bottom side to define a height of the land vehicle;
a wake disruptor arranged along the rear side of the land vehicle in a configuration to reduce drag of the land vehicle, the wake disruptor forming a protrusion having a width extending outwardly from the rear side by a distance of 1.5 to 8 inches and having a length extending at least partially in a direction of the land vehicle width between a pair of opposing terminal ends, the pair of opposing terminal ends each forming an end configured for airflow to impinge there against during vehicle operation,
where the wake disruptor has one or more linear or non-linear portions each forming a portion of the wake disruptor length extending substantially in the direction of the land vehicle width, where the one or more linear or non-linear portions are arranged below a midpoint of a height of the rear side of the land vehicle, as measured from the bottom side of the vehicle to the top side of the land vehicle, and at least at a height greater than or equal to ten percent of the rear side height,
where the wake disruptor width tapers along the length and narrows in a direction towards each terminal end.

18. The land vehicle of claim 17, where the one or more linear or non-linear portions are arranged to form a V or W-shape, in an upright or inverted arrangement.

19. The land vehicle of claim 17, where the entire wake disruptor is arranged below the midpoint of the height of the rear side of the land vehicle.

20. The land vehicle of claim 17, where the protrusion width extends outwardly from the rear side by a distance of 2 to 4 inches.

* * * * *